United States Patent [19]
Beatenbough

[11] 4,269,463
[45] May 26, 1981

[54] CONNECTOR

[75] Inventor: Charles M. Beatenbough, Westfield, Ind.

[73] Assignee: Bell Telephone Laboratories, Incorporated, Murray Hill, N.J.

[21] Appl. No.: 57,334

[22] Filed: Jul. 13, 1979

[51] Int. Cl.[3] .......................... H01R 13/62; H02B 1/10
[52] U.S. Cl. .............................. 339/91 R; 339/126 R
[58] Field of Search ................. 339/91 R, 126 R, 128, 339/125 R, 99 R, 176 R, 156 R, 159 R; 179/1 PC

[56] References Cited

U.S. PATENT DOCUMENTS

| | | | |
|---|---|---|---|
| 3,402,384 | 9/1968 | Murakami et al. | 339/128 |
| 3,448,429 | 6/1969 | Szeremy et al. | 339/128 X |
| 3,523,269 | 8/1970 | Witek et al. | 339/91 R |
| 3,850,497 | 11/1974 | Krumreich et al. | 339/126 R |
| 4,103,985 | 8/1978 | Krolak et al. | 339/91 R X |
| 4,124,785 | 11/1978 | Seretny et al. | 179/103 |

*Primary Examiner*—Eugene F. Desmond
*Attorney, Agent, or Firm*—Sylvia J. Chin; Harry L. Newman

[57] ABSTRACT

A connector (10) has been developed which is capable of snap-mounting into a predetermined position in a housing (100). The connector is specifically configured with surfaces (38, 42) which cooperate together in separating corresponding surfaces (106, 130) in the housing so that the connector can move into the predetermined position.

18 Claims, 7 Drawing Figures

FIG. 2
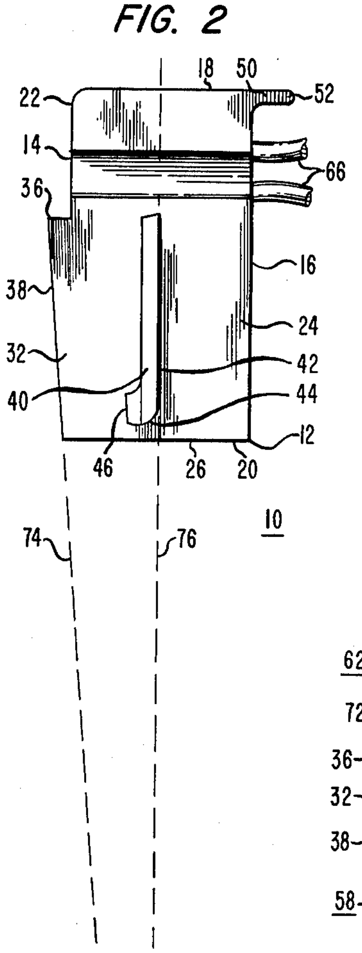
FIG. 3
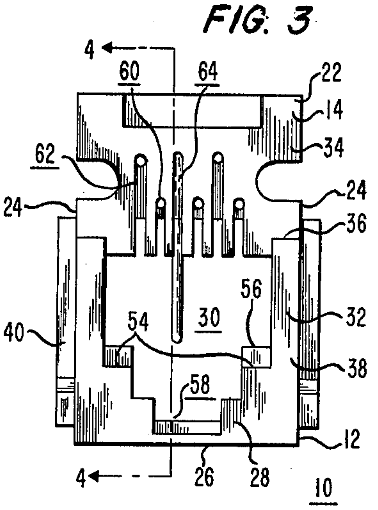
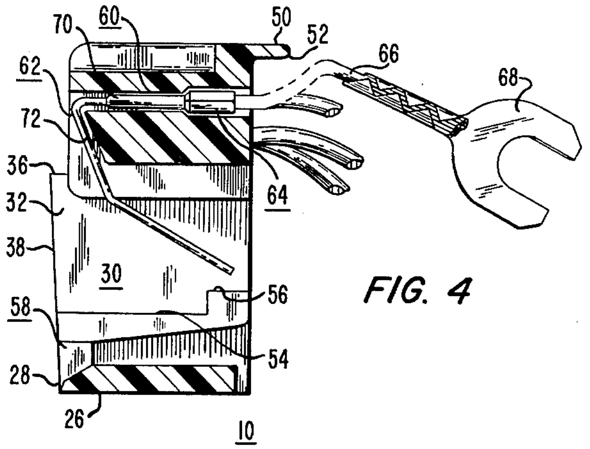
FIG. 4
FIG. 5
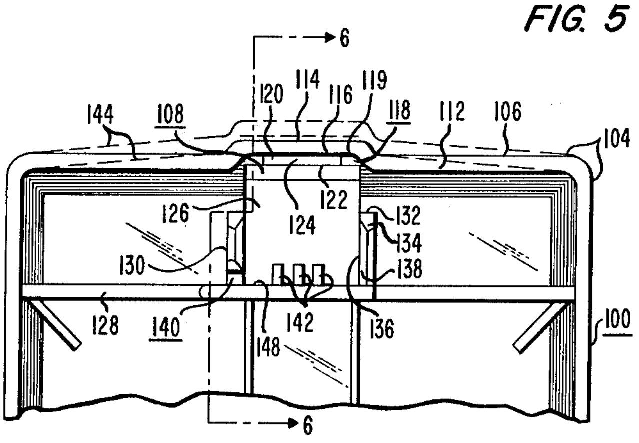

CONNECTOR

BACKGROUND OF THE INVENTION

1. Field of the Invention

This invention relates to the field of electrical connectors and more particularly, to female connectors which are referred to as modular jacks in the telephony art.

2. Description of the Prior Art

A modular jack is typically attached to some type of housing, be it housing for a telephone station set or a cover for a terminal block.

To facilitate its installation in a housing, a modular jack can be designed with various structural configurations. For example, U.S. Pat. No. 3,850,497 discloses three different modular jack configurations. In one embodiment, the jack includes hollow bosses for accommodating fasteners which can secure the jack to a housing. In an other two embodiments, the jack is adapted to slip-mount between the edges of two holding walls.

While these modular jack configurations are satisfactory, there is room for improvement.

There is desire to develop a connector which is more reliable, simple to manufacture, easy to install in a housing, inexpensive, and more protective against entry of dust.

SUMMARY OF THE INVENTION

Pursuant to this invention, a connector has been developed which is capable of snap-mounting into a predetermined position in a housing. The connector is specifically configured with external surfaces which cooperate together to help move the connector into the predetermined position.

In the illustrative embodiment, the connector comprises a dielectric enclosure and a plurality of spring contact assemblies carried by the enclosure. The enclosure, which comprises a plug receiving cavity open to the front of the enclosure, includes substantially planar exterior front facing flange surfaces and rear facing surfaces which are slightly skewed with each other so as to cooperate as a wedge. These exterior surfaces are capable of wedging apart a housing wall and associated interior surfaces in a housing to help gain entry of the connector into the predetermined position. In the predetermined position, the flanges on the enclosure protrude into an aperture of the housing wall to anchor the connector in place.

The invention and its objectives, features, and advantages will be readily discerned from a reading of the description to follow of the illustrative embodiment.

BRIEF DESCRIPTION OF THE DRAWING

FIG. 2 is a side view of the connector;

FIG. 3 is a front view of the connector with only one spring contact assembly shown installed;

FIG. 4 is a sectional view taken along line 4—4 in FIG. 3, showing in detail the spring contact assembly in the connector;

FIG. 5 shows in partial rear view the housing and the flexibility of one housing wall;

DETAILED DESCRIPTION OF AN ILLUSTRATIVE EMBODIMENT

Figure 1:
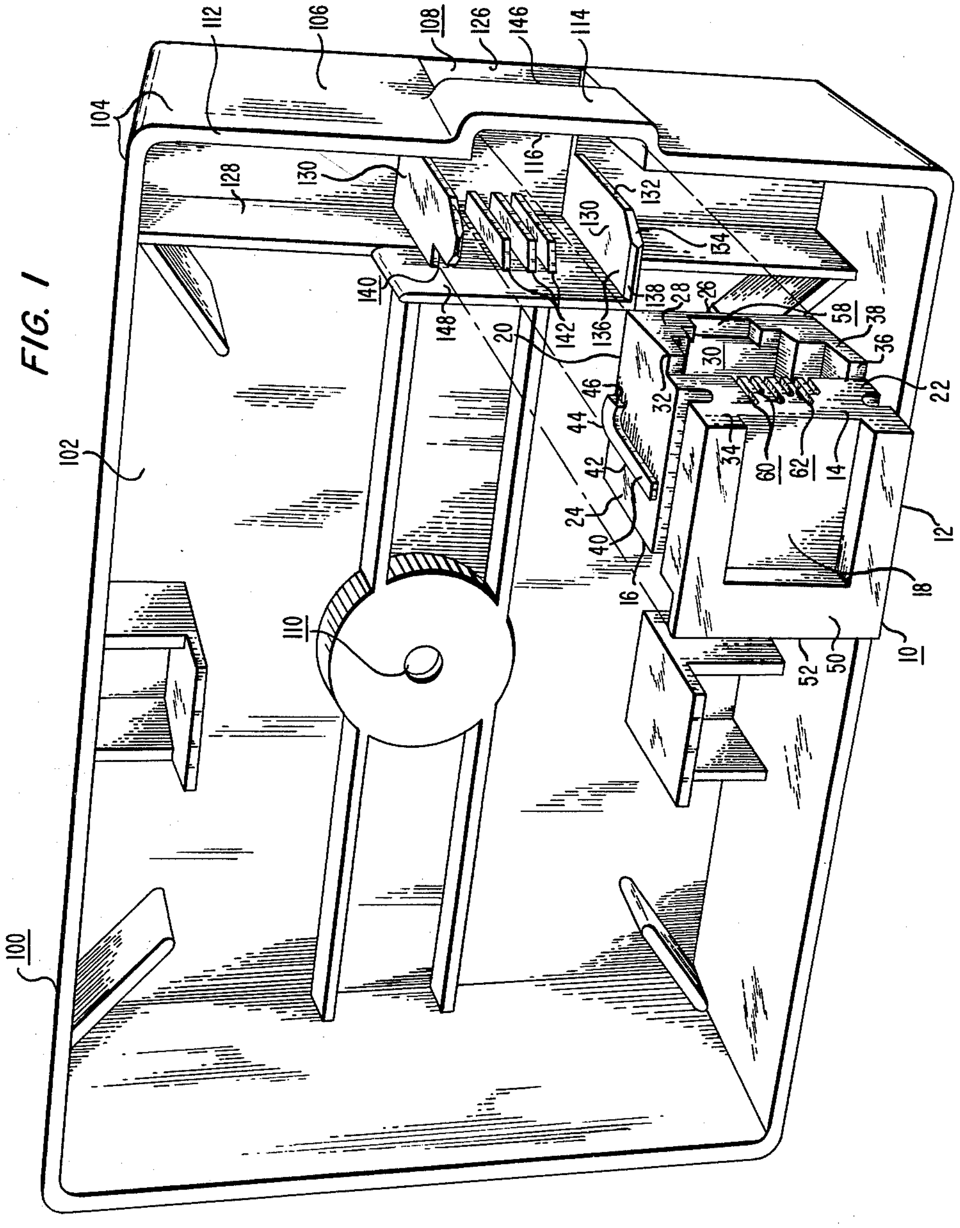
FIG. 1 is an exploded perspective view of an illustrative embodiment of the inventive connector and its associated housing.

Shown in exploded perspective view in FIG. 1 is an illustrative embodiment 10 of a connector made in accordance with this invention and an illustrative embodiment 100 of a housing adapted for receiving the connector 10.

The connector 10 comprises an enclosure 12 having a front 14 and a rear 16, as well as upper and lower ends 18 and 20 respectively. The designated orientation given to the connector 10 is for descriptive purposes; it is not meant to restrict the invention. For example, it is apparent that the lower end 20 can actually be designated the upper end, the rear, or the front instead, with corresponding changes in the other designations.

The enclosure 12, which can be molded from a dielectric material such as acrylonitrile butadiene styrene, comprises an upper wall 22, sidewalls 24, a lower wall 26, a front wall 28, and a plug receiving cavity 30. The cavity 30 has an entrance which opens to the front 14 of the enclosure 12. Also extending rearwardly from the upper wall 22 is an overhang 50 with a rear edge 52.

Integrally attached to the enclosure 12 and the sidewalls 24 are a pair of forward extending flanges 32 which protrude beyond a front surface 34 of the upper wall 22. Each flange 32 includes an upper side flange surface 36 and a front flange surface 38. In this embodiment, the front surface of the front wall 28 is continuous with the front flange surfaces 38 to form one planar surface.

Extending outwardly from either sidewall 24 is an elongated rib 40, which includes a forward facing surface 46, a substantially rear facing surface 42, and a beveled surface 44 at its lower end. The rear facing rib surfaces 42 are slightly skewed with the front flange surfaces 38 such that an imaginary plane 74 containing the front flange surfaces 38 and an imaginary plane 76 containing the rear facing rib surfaces 42 converge going toward the lower end 20 of the connector 10 as shown in FIG. 2.

As seen in FIG. 3, the connector 10 has a plug receiving cavity 30 similar to that disclosed in U.S. Pat. No. 3,850,497, also assigned to the assignee of the present invention. As in the prior art connector, the plug receiving cavity 30 is also defined by a pair of ledges 54 which extend from the front of the enclosure 12 and along the interior surfaces of the sidewalls 24 to corresponding shoulders 56 near the rear 16. Furthermore, the front wall 28 includes a single notch 58 providing access to the cavity 30.

Extending from the front surface 34 to the rear of the upper wall 22 are a multiplicity of orifices 60 for accommodating spring contact assemblies 64. The assemblies 64, one of which is shown in greater detail in FIG. 4, are similar to those described in U.S. Pat. No. 3,850,497. Each contact assembly 64 comprises an insulated conductor 66 which is terminated with a cord tip 68 on one end and with a wire spring contact 72 via a splicing conductive member 70 at the other end. Each wire spring contact 72 seats into an associated groove 62 along the front surface 34 of the upper wall 22 and extends in rearward cantilever fashion in the plug receiving cavity 30.

Referring to FIGS. 1 and 5, the illustrative housing 100, which is made from a dielectric material such as polycarbonate, comprises a front housing wall 102, a plurality of side housing walls 104, and a rear 112. One of the side housing walls, denoted by 106, includes an interior wall surface 116 and an aperture 108. The aperture 108 accommodates the flanges 32 and provides a thru access to the entrance of the plug receiving cavity 30 when the connector 10 is mounted. The orientation designation given to the housing 100 does not correspond with the one given the connector 10. The housing 100 is seen in a rear perspective view in FIG. 1, while the connector 10 is seen in a top perspective view.

The illustrative housing 100 also includes a screw-engaging aperture 110 for accommodating a screw which fastens the housing to a wall terminal block, similar to one shown in U.S. Pat. No. 4,071,696. When the housing 100 is secured to the terminal block, the wall 106 is usually oriented as a side or bottom housing wall.

In the illustrative embodiment, the housing 100 is configured to operate as a cover for a terminal block. However, it is apparent that the housing 100 disclosed is merely illustrative and that other housing configurations can be envisioned depending on the expected use of the housing 100 and the connector 10.

As most clearly seen in FIG. 5, the housing wall 106 includes a raised region 114 between the aperture 108 and the rear 112 of the housing 100. The interior housing wall surface 116 along the raised region 110 includes a pair of channels 118 which have surfaces 119 and lead to the aperture 108 from the rear 112 and a thickened portion 120 which has a first planar surface 122 and a second beveled surface 124. The surface 124 is designed to facilitate insertion of the connector 10, while the surface 122 is designed to abut the front surface 34 of the connector 10 to exclude dust when the connector 10 is mounted.

In a region 126 adjacent the aperture 108, the front wall 102 is of a reduced thickness to form an interior recess for the lower wall 26 of the connector 10.

Included in the housing 100 is a shelf 128 which is located behind the housing wall 106. Extending upright from the shelf 128 toward the housing wall 106 are a pair of partitions 130, which are appropriately spaced apart from each other, as well as from the housing wall 106, to accommodate the connector 10 thereinbetween. The partitions 130 include surfaces 132 which face the housing wall 106 and are designed to engage the rear facing rib surfaces 42, and beveled entrance surfaces 134 which operate as entrance ramps to the surfaces 132. The partitions 130 also have beveled surfaces 138 near the rear 112 to help ease entry of the connector 10.

One of the partitions 130 includes an opening 140 open to the rear 112 of the housing 100. Also, the shelf 128 includes a plurality of spaced housing ribs 142 which help to protect the ends of the spring contacts 72 when the connector 10 is mounted.

INSERTION OPERATION

Figure 6:
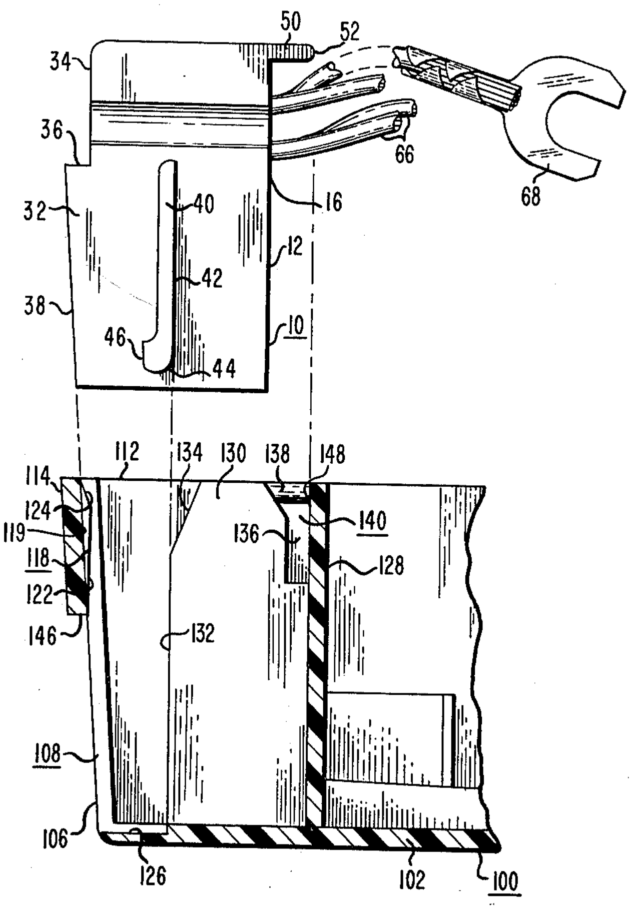
FIG. 6 depicts the housing in sectional view taken along line 6—6 in FIG. 5 with the connector being inserted.

Referring to FIG. 6, the connector 10 snap-mounts into its predetermined position in the housing 100 from the housing rear 112 by moving along the housing wall 106 toward the front wall 102. During insertion, the front flange surfaces 38 press against and are guided by the channels 118 of the housing wall 106, while the rear facing rib surfaces 42 press against and are guided by the partition surfaces 134 and 132.

The wedged configuration made by the front flange surfaces 38 and the rear facing rib surfaces 42, as depicted in FIG. 2, causes the housing wall 106 and the partitions 130 to move away from each other. This forced separation between the housing wall 106 and the partitions 130 allows the connector 10 access into its predetermined position in the housing 100 where the entrance of the cavity 30 can align with the aperture 108 and the flanges 32 can protrude into the aperture 108.

In the illustrative embodiment, the channel surfaces 119 are slightly skewed with the partition surfaces 132 approximately the same amount as are the corresponding front flange surfaces 38 with the rear facing rib surfaces 42. The skewing of the housing surfaces 119 and 132 help the connector surfaces 38, 42 in wedging apart the housing wall 106 and the partitions 130. However, it is apparent that the skewing can be merely between the housing surfaces 119, 132 or the connector surfaces 38, 42 so long as the connector surfaces 38, 42 can cooperate effectively together as a wedge in separating the housing wall 106 and the partitions 130 during connector insertion.

Figure 7:
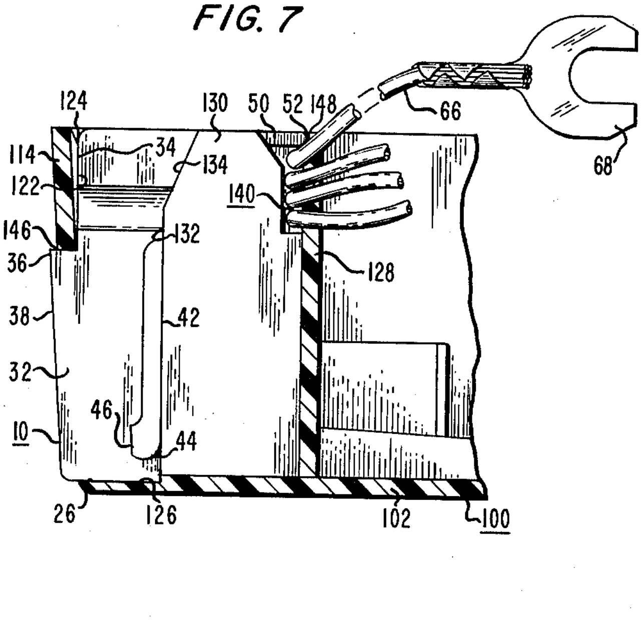
FIG. 7 depicts the connector in position in the housing.

FIG. 7 shows the connector 10 in place. When the flanges 32 protrude into the aperture 108, the upper side flange surfaces 36 interlock with an edge surface 146 of the housing wall 106. Also, the partitions 130 maintain the flanges 32 in the aperture 108 while the front surface 34 of the upper wall 22 substantially abuts the housing wall surface 122 to limit protrusion of the flanges 32. At the same time, the lower wall 26 substantially abuts the interior recess in the front wall region 126.

To prevent accidental pullout of the connector 10 through the aperture 108, the ribs 40 are designed with the forward facing surfaces 46 which can abut the interior surface 116 of the housing wall 106 during attempted pullout.

The housing wall 106 flexes away from the partitions 130 during connector insertion to allow connector 10 entry, as shown in FIG. 5, with the deflected housing wall 106 depicted by broken lines 144. Upon insertion, the housing wall 106 flexes substantially back to its unflexed state to lock the connector 10 in place. It is apparent that flexing of the partitions 130 and/or the other housing walls can also occur or by design be made to occur instead to allow entry of the connector 10.

When the connector 10 is in place in the housing 100, the rear edge 52 of the enclosure overhang 50 also substantially abuts a surface 148 of the housing shelf 120 to define a substantially enclosed space for the rear of the connector 10. Substantially covering the connector rear 16 reduces the chances of contamination of the spring contacts 72 from dust and moisture, which can enter otherwise from the rear of the connector 10.

The opening 140 permits a thru passage for the insulated leads 66 of the connector 10 into the open to make other terminations. In the illustrated connector application, only four insulated leads 66 are needed and shown in FIG. 7 though the connector 10 can accommodate more.

In the illustrative embodiment, the surfaces defining the aperture 108 engage the flanges 32 to lock the connector 10 in place. However, it is apparent that other surfaces incorporated in the housing 100 can be designed to engage the flanges 32 and still register or align the entrance of the cavity with the aperture 108.

While the invention has been described with respect to an illustrative embodiment, it is to be understood that various modifications might be made thereto without departing from the spirit and scope of the following claims.

I claim:

1. A connector (10) comprising:
a dielectric enclosure (12) having a front (14) and a rear (16), the enclosure comprising:
a plug receiving cavity (30) having an entrance open to the front of the enclosure;
forward extending flanges (32) having front facing flange surfaces (38); and
rear surface means (42) having rear facing surfaces, the front facing surfaces and the rear facing surfaces respectively engaging and separating corresponding surface means (106, 130) in a housing (100) during insertion of the enclosure into the housing so as to permit the enclosure to move into a predetermined position in the housing behind a housing wall (106) having an aperture (108) where the entrance of the cavity is aligned with the aperture, the flanges are situated within the perimeter of the aperture, and the enclosure is maintained in the predetermined position by interior surface means (132) displaced rearwardly from the wall; and
a plurality of contact structures (64) carried by the enclosure.

2. A connector (10) comprising:
a dielectric enclosure (12) having a front (14) and a rear (16), the enclosure comprising:
a plug receiving cavity (30) having an entrance open to the front of the enclosure;
forward extending flanges (32) having front flange surfaces (38) and locking surface means (36); and rear surface means (42);
a plurality of contact structures (64) carried by the enclosure; and
a housing (100) comprising:
a housing wall (106) having an interior surface (116) and an exterior surface, the housing wall including an aperture (108) at least the size of the entrance of the plug receiving cavity (30);
stop means (146) for engaging the locking surface means (36) of the enclosure; and
interior surface means (130) for engaging the rear surface means (42) of the enclosure, the interior surface means (130) being spaced behind the housing wall (106) such as to engage the rear surface means (42) of the connector;
the front flange surfaces and the rear surface means cooperating together in sufficiently separating the housing wall and the interior surface means during enclosure insertion so as to help move the enclosure into a predetermined position where the entrance of the cavity is aligned with the aperture and the locking surface means substantially abuts the housing stop means to lock the enclosure in place.

3. The combination pursuant to claim 2 where the enclosure (12) of the connector (10) further comprises:
an overhang (50) having a rear edge (52) where the overhang extends rearwardly from the upper wall (22); and
where the housing structure (100) further comprises a second interior surface means (148) for substantially abutting the rear edge of the overhang.

4. The combination pursuant to claim 2 where the housing (100) comprises:
a shelf (128) located behind the housing wall (106); and
a pair of partitions (130) extending upright from the shelf and spaced apart slightly more than sidewalls (24) of the dielectric enclosure (12) and in alignment with the aperture (108) in the housing wall (106) for aligning the cavity with the aperture, the partitions having surfaces (132) facing the housing wall.

5. The combination pursuant to claim 4 where at least one of the partitions (130) includes an opening (140) open to a free edge of the partition.

6. A connector (10) comprising:
a dielectric enclosure (12) having a front (14) and a rear (16), the enclosure comprising:
a plug receiving cavity (30) open to the front of the enclosure;
front surface means (34);
forward extending flanges (32), the flanges having front flange surfaces (38); and
rear surface means (42), where the front flange surfaces and the rear surface means cooperate together in sufficiently separating corresponding surface means (106, 130) in a housing (100) during connector insertion so as to help move the connector into a predetermined position in the housing behind a housing wall (106) having an aperture (108) with the flanges protruding into the aperture from behind the wall and where upon insertion, the front surface means (34) substantially abut the housing wall (106) and the enclosure is maintained against the housing wall by interior surface means (132) in the housing (100); and
a plurality of contact structures (64) carried by the enclosure.

7. The connector (10) pursuant to claim 6 where the flanges (32) further include locking surface means (36) extending transverse to the front flange surfaces (34) and the rear surface means (42), and where upon insertion of the enclosure (12), the locking surface means substantially abut an edge (146) of the aperture (108) to lock the connector in place.

8. In combination with the connector (10) constructed in accordance with claim 6, the housing (100) comprising:
a housing wall (106) having an interior surface (116) and an exterior surface, the housing wall including an aperture (108) slightly larger than the entrance of the plug receiving cavity (30) and sufficiently large to accommodate the flanges (32) of the enclosure; and
interior surface means (130) for engaging the rear surface means (42) of the enclosure, the interior surface means (130) being spaced behind the housing wall (106) such as to engage the rear surface means (42) of the enclosure sufficiently to maintain the flanges in the aperture.

9. The combination pursuant to claim 8 where the housing (100) comprises:
a shelf (128) located behind the housing wall (106); and
a pair of partitions (130) extending upright from the shelf and spaced apart slightly more than sidewalls (24) of the dielectric enclosure (12) and in alignment with the aperture (108) in the housing wall (106) for aligning the flanges in the aperture, the partitions having surfaces (132) facing the housing wall.

10. The combination pursuant to claim 8 where the enclosure (12) of the connector (10) further comprises:

an overhang (50) having a rear edge (52) where the overhang extends rearwardly from the upper wall (22); and where the housing structure (100) further comprises a second interior surface means (148) for substantially abutting the rear edge of the overhang.

11. The combination pursuant to claim 9 where at least one of the partitions (130) includes an opening (140) open to a free edge of the partition.

12. A connector (10) comprising:

a dielectric enclosure (12) having a front (14) and a rear (16), and upper (18) and lower (20) ends, the enclosure comprising:

an upper wall (22) having a front surface (34);

a pair of sidewalls (24);

a plug receiving cavity (30) open to the front of the enclosure;

forward extending flanges (32) projecting substantially from the sidewalls, the flanges having front flange surfaces (38); and rear surface means (42), where the front flange surfaces and the rear surface means are skewed with each other such that an imaginary plane (74) containing the front flange surfaces and an imaginary plane (76) containing the rear surface means converge going toward the lower end of the connector, and where the front flange surfaces and the rear surface means cooperate as a wedge in sufficiently separating corresponding surface means (106, 130) in a housing (100) during connector insertion so that the connector can move into a predetermined position in the housing behind a housing wall (106) having an aperture (108) with the flanges protruding into the aperture from behind the housing wall and where the front surface (34) of the upper wall (22) substantially abuts the housing wall (106) when the enclosure is positioned in the housing (100); and a plurality of contact structures (64) carried by the enclosure.

13. The connector (10) pursuant to claim 12 where the rear surface means (42) is beveled along its lower end.

14. The connector (10) pursuant to claim 12 where the enclosure (12) further comprises:

a pair of substantialy upright ribs (40) integrally attached to and projecting outwardly from the sidewalls (24), the ribs including the rearward facing surface means (42).

15. The connector (10) pursuant to claim 14 where the ribs (40) include lower ends with surfaces (44) continuous with the rearward facing surfaces (42) and curving toward the front (14) of the dielectric enclosure (12).

16. A connector comprising:

a dielectric enclosure having a front and a rear, the enclosure comprising:

a plug receiving cavity having an entrance open to the front of the enclosure;

a pair of frontwardly extending flanges straddling the entrance of the plug receiving cavity, each flange including front facing surface means; and rear facing surface means situated to the rear of the front facing surface means;

a plurality of contact structures (64) carried by the enclosure; and a housing to which the enclosure is mounted, the housing comprising:

a wall having aperture means for accommodating the flanges and first interior surface means; and second interior surface means to the rear of the wall, the normal spacing between the first and second interior surface means being less than the spacing between the front facing and rear facing surface means of the enclosure;

the front and rear surface means of the enclosure respectively engaging and displacing the first and second surface means of the housing from the normal spacing during insertion of the enclosure into the housing; and the flange being positioned within the aperture means, the entrance of the plug receiving cavity being aligned with the aperture means, and the first and second interior surface means returning to the normal spacing when insertion is completed.

17. A connector as in claim 16 wherein the flanges further include locking surface means that extend generally orthogonal to the front and rear facing surface means, and the housing wall includes stop means for engaging the locking surface means when insertion of the enclosure is completed to secure the enclosure to the housing.

18. A connector comprising:

a dielectric enclosure having a front and a rear, the enclosure comprising:

a plug receiving cavity having an entrance open to the front of the enclosure;

a pair of frontwardly extending flanges straddling the entrance of the plug receiving cavity, a front of each flange providing a first deflecting surface and an upper end of each flange providing a locking surface, the locking surface extending generally orthogonal to the deflecting surface;

a rear facing second deflecting surface situated to the rear of the first deflecting surface;

a plurality of contact structures carried by the enclosure; and a housing to which the enclosure is mounted, the housing comprising:

a wall having an opening and a first interior surface above the opening, an upper perimeter of the opening providing a stop surface;

a second interior surface to the rear of the wall, the normal spacing between the first and second interior surfaces being less than the spacing between the first and second deflecting surfaces of the enclosure;

the first and second deflecting surfaces of the enclosure respectively engaging and displacing the first and second interior surfaces from the normal spacing during insertion of the enclosure into the housing; and the flanges being positioned within the opening, the entrance of the plug receiving cavity being aligned with the opening, and the first and second entrance surfaces returning to the normal spacing when insertion is completed, the locking surfaces of the flanges being positioned adjacent to the stop surface of the opening to secure the enclosure to the housing.

* * * * *